H. H. HENDRIX.

PROJECTILE.

APPLICATION FILED APR. 18, 1911.

Reissued June 20, 1911.

13,258.

Witnesses

Oliver W. Holmes

E. B. McBath

Inventor

H. H. Hendrix

By Chas. E. Brock

Attorney

UNITED STATES PATENT OFFICE.

HARRISON H. HENDRIX, OF POWELL STATION, TENNESSEE.

PROJECTILE.

13,258. Specification of Reissued Letters Patent. Reissued June 20, 1911.

Original No. 966,744, dated August 9, 1910, Serial No. 565,910. Application for reissue filed April 18, 1911. Serial No. 622,720.

*To all whom it may concern:*

Be it known that I, HARRISON H. HENDRIX, a citizen of the United States, residing at Powell Station, in the county of Knox and State of Tennessee, have invented a new and useful Improvement in Projectiles, of which the following is a specification, reference being had to the accompanying drawing.

My improvement relates particularly to projectiles intended for firing from smooth bore and rifle guns, provision being made in the projectile for imparting rotation thereto by the action of the atmosphere during the flight of the projectile.

The object of the invention is to produce such a projectile adapted for accurate flight and for economical manufacture and to be used in a smooth bore gun, in order that, in the use of the projectile, there may be freedom from fouling and clogging of the gun and the disasters following such fouling and clogging.

A characteristic of my projectile is its adaption to spread or "bur" at the forward end upon making impact against a hard body.

Figure 1:
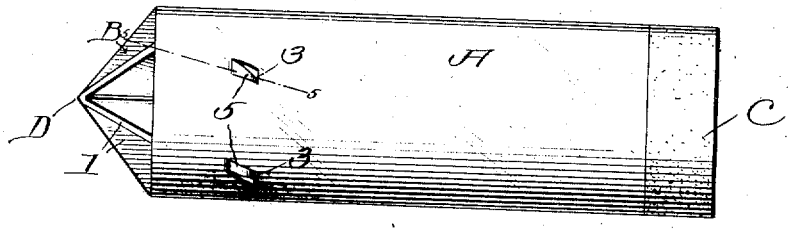
Figure 2:
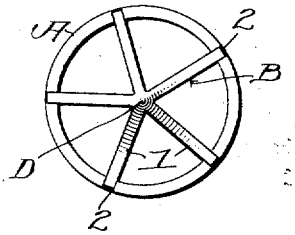
Figure 4:
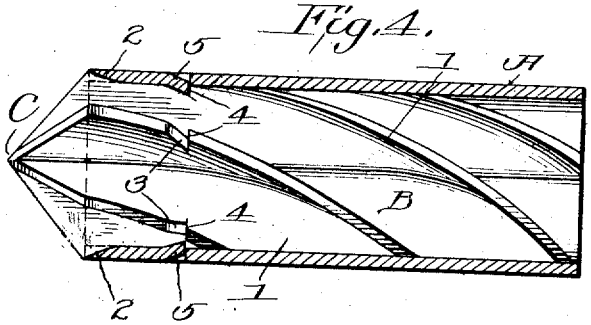
Figure 3:
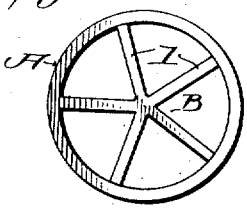
Figure 5:
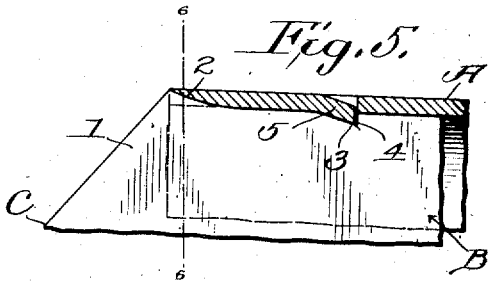
Figure 6:
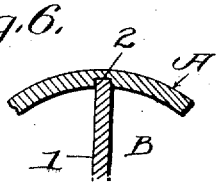
Figure 7:
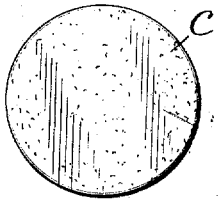
Figure 8:
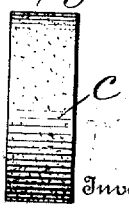

In the accompanying drawings: Figure 1 is a side elevation of my projectile. Fig. 2 is a front elevation. Fig. 3 is a rear elevation without the closing member. Fig. 4 is a sectional side elevation of the projectile. Fig. 5 is an enlarged detail section on the line 5—5 of Fig. 1. Fig. 6 is a section on the line 6—6 of Fig. 5. Fig. 7 is a rear elevation and Fig. 8 a side elevation of a disk or closing member applied to the rear end of the projectile.

In these drawings A is a shell, within which is fitted a core B, and a closing disk C completes the projectile as placed in the gun. The core B is formed of steel or other hard metal, while the shell A may be of a softer metal, in order to avoid injury to the gun. The core B is in the form of a spiral and comprises any desired number of blades or wings 1, which wings are approximately radial as seen in a cross section of said core, and they are out of parallel with reference to the core axis. This inclination of the wings or blades is greatly increased from front to rear, thus giving said blades a slight curve lengthwise, the extent of curvature increasing as the blades approach the rear end of the core. From the rear end to a point adjacent the front end the said blades have a uniform diameter, adapting the said core to fit snugly within the shell A. But adjacent the forward end the diameter of the core is gradually increased, by increasing the width of the wings, and to accommodate this increase in the diameter of the core the forward portion of the shell is provided with interior grooves 2 within which said blades fit. The extreme forward portion of the core tapers, thus forming a more or less conical point D. The shell A is of less length than the core B and stops short of the tapered forward portion.

In order to lock the core and shell together, I cut into the edges of the wings suitable notches 3 thereby forming shoulders 4, directed to the forward end of the core, and the shell is suitably slotted or cut and said cut portions form tongue portions 5 which when pressed inwardly will engage the notches 3 and will bear upon the shoulders 4. The engagement of said tongues and shoulders prevent rearward movement of the shell upon the core during the discharge and flight of the projectile.

As the construction of the core leaves a free passage through the shell I provide the closure disk C, which is solid and of the same diameter as the shell. This disk closes the rear end of the projectile and receives the pressure of the explosive gases, and gives to the projectile the full force of their expansive action. It is not necessary that the said disk should be attached to the projectile and it is not intended that it shall remain connected thereto after its passage from the gun. But for convenience in handling it may be temporarily secured by any suitable means to the projectile, being automatically detached, dislodged, or broken therefrom during the discharge of the projectile from the gun, said disk then falling away from the projectile in the same manner as the ordinary wad in a cartridge.

The projectile is designed for use in connection with smooth bore and rifle guns, and in order to adapt it to such use the blades form a right hand spiral. It will be obvious that if the direction of the twist in the blades was the reverse of that of the rifled gun the tendency of the rush of air through the projectile after it was fired would be directly opposite to the direction of rotation imparted to the projectile by the gun.

In operation, the projectile is placed into a suitable gun in front of an explosive charge. Said charge is then exploded, the force thereof going against the disk, C, and driving the entire projectile forward, said disk, as above stated, leaving the course of the main portion, (the core B, and the shell, A,) of the projectile, and such main portion going forward in a direct course. While the projectile thus traverses its course, the air rushes through the passages between the wings 1, and the shell A, from the front to the rear, bearing against the oblique faces of said wings and thereby causing a rotation of the projectile. The entrance of air into said passages is facilitated by making the point of the core B, obtuse, as shown by the drawings and above described. If said point were acute, it would tend to spread the air outward over the front edge of the shell, A, without entering said passages. In this manner the projectile moves without change in its organization until the point strikes a sufficiently hard object to cause such a sudden arrest of the core B, as will cause the shell, A, to slide forward over said core, the front end of the shell, on account of the outward extension of the wings, 1, splitting along and adjacent the grooves or notches, 2, and the intermediate portions of the shell flaring or "burring" outward until they meet the hard core or object against which the point of the core B, has struck, and then flaring or "burring" still further, if the momentum of said shell is sufficient and the core against which impact has been made is hard enough. In thus moving, the depressed portions, 5, of the shell move forward away from the shoulders, 4.

I claim as my invention:—

1. In a projectile, a cylindrical shell open at each end, and a core fitting said shell, said core comprising spiral blades tapering to a point in advance of the shell, the said blades interlocking with the shell.

2. A projectile comprising a core, a cylindrical shell, and a closing member, said shell surrounding said core and said core having approximately radial, longitudinal wings which are parallel to each other and out of parallel to the axis of said core and have irregularities in their outer edges making engagement with corresponding irregularities in said shell, and said core extending forward of the forward end of said shell, substantially as described.

3. A projectile comprising a core, a cylindrical shell surrounding said core, and a closing member, said shell having interior notches or grooves at its forward end, and said core having approximately radial, longitudinal wings extending into the notches of said shell and arranged parallel to each other and out of parallel to the axis of said core, and said core extending forward of the forward end of said shell, substantially as described.

4. A projectile comprising a core, a cylindrical shell surrounding said core, and a closing member, said shell having interior notches or grooves at its forward end, and said core having approximately radial, longitudinal wings extending into notches of said shell and arranged parallel to each other and out of parallel to the axis of said core, and the outer edges of said wings having notches and the wall of said shell being pressed into said notches, and said core extending forward of the forward end of said shell substantially as described.

5. A projectile comprising a core, a cylindrical shell, and a closing member, said shell surrounding said core and said core having approximately radial, longitudinal wings which are parallel to each other and out of parallel to the axis of said core and have irregularities in their outer edges making engagement with corresponding irregularities in said shell, and said core being obtusely pointed forward of the forward end of said shell, substantially as described.

6. A projectile comprising a core, a cylindrical shell surrounding said core, and a closing member, said shell having interior notches or grooves at its forward end, and said core having approximately radial, longitudinal wings extending into the notches of said shell and arranged parallel to each other and out of parallel to the axis of said core, and said core being obtusely pointed forward of the forward end of said shell, substantially as described.

7. A projectile comprising a core, a cylindrical shell surrounding said core, and a closing member, said shell having interior notches or grooves at its forward end, and said core having approximately radial, longitudinal wings extending into the notches of said shell and arranged parallel to each other and out of parallel to the axis of said core, and the outer edges of said wings having notches and the wall of said shell being pressed into said notches, and said core being obtusely pointed forward of the forward end of said shell, substantially as described.

HARRISON H. HENDRIX.

Witnesses:
E. S. Barnett,
Nora Byington.